Patented Nov. 7, 1939

2,178,545

UNITED STATES PATENT OFFICE 2,178,545

PRESERVING RUBBER

William P. ter Horst, Lakewood, Ohio, assignor to Wingfoot Corporation, Wilmington, Del., a corporation of Delaware No Drawing. Application April 17, 1936,
Serial No. 74,965

8 Claims. (Cl. 18—50)

This invention relates to the treatment of rubber and compounds therefor. More particularly it relates to materials for resisting the deterioration of rubber due to ageing.

It has been discovered that this natural deterioration may be retarded and even largely eliminated by the incorporation into the rubber mix of substances derived from aromatic hydroxy compounds, formaldehyde, and ammonium hydrogen sulphide.

The materials of the invention may be prepared stepwise or in one step.

For example formaldehyde, ammonium hydrogen sulphide, and an aromatic hydroxy compound may be mixed and reacted. Alternatively, if desired, the formaldehyde and ammonium hydrogen sulphide may be reacted to form pentamethylene diamino disulphide. (Beilstein Handbuch, 4th ed., vol. 1, page 563). This material may then be reacted with the aromatic hydroxy compound. This latter reaction may possibly take place according to the equation

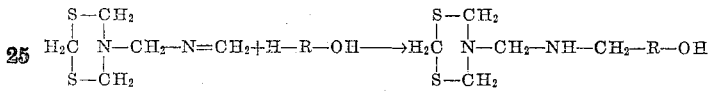

but this is not definitely known. Following are a number of examples demonstrating the practice of the invention.

Example 1

Formaldehyde and ammonium hydrogen sulphide were reacted in the known manner to form pentamethylene diamino disulphide. Fifty-eight grams of beta naphthol dissolved in 100 grams of boiling xylol were added to a suspension of 65 grams of pentamethylene diamino disulphide in 70 grams of boiling xylol. The mixture was refluxed for 12 hours. The xylol was then distilled off. The product was dried at 110–115° C. and extracted with 600 grams of boiling 2% NaOH to remove unchanged beta naphthol. It was then washed twice with 300 cc. portions of boiling water and air-dried. The product was a light-brown powder.

Example 2

Seventy-two grams of beta naphthol were added to 160 grams of 32% $NH_4SH$ in water. To this 244 grams of 37% aqueous formaldehyde were added at a temperature below 25° C. On standing overnight a resin formed. This resin was washed three times with 500 cc. portions of boiling water and heated to 130° C. to effect drying and fusion. The yield was 134 grams of a bright yellow, transparent resin.

Example 3

A mixture of 92.5 grams of p-hydroxy diphenylamine, 81 grams of pentamethylene diamino disulphide, and 300 grams of toluol was refluxed for 12 hours. The toluol was then evaporated off. The product was extracted twice with 100 cc. portions of boiling ethylene dichloride to remove excess pentamethylene diamino disulphide. The product was a light-brown resin.

Example 4

Eighty-five grams of pentamethylene diamino disulphide and 60 grams of o-amino phenol were added to 100 grams of toluol. A clear solution was obtained on heating, but there was a separation into two layers within 5 minutes, an insoluble oil forming the bottom layer. On further heating this became a solid. The mixture was refluxed for two hours. The product was extracted twice with 200 cc. portions of boiling toluol. It was then cooled and ground. The yield was 125 grams.

Example 5

To 81 grams of pentamethylene diamino disulphide dissolved in 100 grams of toluol were added 55 grams of hydroquinone. A reaction took place on boiling but at no time did all the material go into solution. The mixture was refluxed for two hours. The product was washed twice with 200 cc. portions of boiling toluol. The yield was 96 grams of a light-brown powder.

The reactions involved in the formation of these reaction products are rather obscure, although one possible reaction has been suggested above, and the products themselves are indefinite, resinous masses. It is therefore possible to have considerable variation in the proportions of the reactants without exceeding the scope of the invention. However, as illustrated by the suggested equation and Examples 1–5, the materials will ordinarily be reacted in the ratio of substantially equimolecular proportions of the aromatic hydroxy compound and pentamethylene diamino disulphide, or the equivalent proportions of one mol of the aromatic hydroxy compound, two mols of ammonium hydrogen sulfide and five mols of formaldehyde.

Also, practice of the invention is not limited to the compounds of the above examples. Representative of other hydroxy compounds which may be employed are methylene di-beta-naphthol, p-hydroxy diphenyl, alpha naphthol, p-tertiary amyl phenol, oxy benzyl alcohol, phenol, cresols, and o-hydroxy biphenyl.

The age resisters of the invention may be used in most of the ordinary rubber formulae. The following is one specific formula in which they have been found by test to yield excellent results:

| | Parts by weight |
|---|---|
| Extracted pale crepe rubber | 100 |
| Zinc oxide | 5 |
| Sulphur | 3 |
| Stearic acid | 1.5 |
| Hexamethylene tetramine | 1 |
| Antioxidant | 1 |

Representative materials of the invention were incorporated into rubber in accordance with the above formula. Samples were cured and tested. Other samples, after cure, were aged 6 days in a bomb at 50° C. and 150 pounds per square inch oxygen pressure, and then tested. The test data follow.

| Cure | Tens. kg/cm.² | Elg. per-cent | Kgs/cm.² | | Aged | | | | Per-cent wt. inc. |
|---|---|---|---|---|---|---|---|---|---|
| | | | 500% | 700% | Tens. kgs/cm.² | Elg. per-cent | Kgs/cm.² | | |
| | | | | | | | 500% | 700% | |

PRODUCT OF EXAMPLE 1

| 35/285 | 84 | 925 | 10 | 23 | 105 | 855 | 14 | 43 | .13 |
|---|---|---|---|---|---|---|---|---|---|
| 50 | 106 | 890 | 13 | 36 | 124 | 825 | 16 | 58 | .23 |
| 70 | 125 | 850 | 16 | 51 | 136 | 795 | 21 | 77 | .23 |

PRODUCT OF EXAMPLE 2

| 35/285 | 69 | 910 | 9 | 21 | 76 | 800 | 14 | 40 | .15 |
|---|---|---|---|---|---|---|---|---|---|
| 50 | 88 | 920 | 10 | 24 | 94 | 845 | 14 | 49 | .31 |
| 70 | 98 | 860 | 14 | 37 | 102 | 805 | 16 | 55 | .67 |

PRODUCT OF EXAMPLE 3

| 35/285 | 98 | 900 | 12 | 33 | 104 | 800 | 18 | 60 | .08 |
|---|---|---|---|---|---|---|---|---|---|
| 50 | 99 | 800 | 18 | 57 | 120 | 780 | 19 | 73 | .08 |
| 70 | 118 | 780 | 20 | 71 | 132 | 740 | 28 | 105 | .13 |

PRODUCT OF EXAMPLE 4

| 35/285 | 95 | 850 | 14 | 41 | 114 | 825 | 16 | 58 | .05 |
|---|---|---|---|---|---|---|---|---|---|
| 50 | 110 | 785 | 19 | 66 | 112 | 765 | 21 | 77 | .19 |
| 70 | 118 | 755 | 23 | 84 | 124 | 725 | 29 | 108 | .85 |

PRODUCT OF EXAMPLE 5

| 35/285 | 77 | 885 | 11 | 28 | 96 | 825 | 15 | 49 | .04 |
|---|---|---|---|---|---|---|---|---|---|
| 50 | 95 | 830 | 14 | 45 | 112 | 785 | 19 | 67 | .07 |
| 70 | 125 | 790 | 22 | 75 | 132 | 750 | 26 | 99 | .16 |

From these data it is readily observed that the compounds are excellent age-resisters.

While only the preferred forms of the invention have been described in detail, it will be apparent to those skilled in the art that various modifications may be made therein without departing from the spirit of the invention or the scope of the appended claims, in which it is intended to cover all features of patentable novelty inherent in the invention.

What I claim is:

1. The method of treating rubber which comprises vulcanizing the same in the presence of the reaction product of about one mol of an aromatic hydroxy compound, five mols of formaldehyde, and two mols of ammonium hydrogen sulfide.

2. The method of treating rubber which comprises vulcanizing the same in the presence of the reaction product of substantially equimolecular proportions of an aromatic hydroxy compound and pentamethylene diamino disulfide.

3. The method of treating rubber which comprises vulcanizing the same in the presence of the reaction product of about one mol of a phenol, five mols of formaldehyde, and two mols of ammonium hydrogen sulfide.

4. The method of treating rubber which comprises vulcanizing the same in the presence of the reaction product of about one mol of a naphthol, five mols of formaldehyde, and two mols of ammonium hydrogen sulfide.

5. A rubber product which has been vulcanized in the presence of the reaction product of about one mol of an aromatic hydroxy compound, five mols of formaldehyde and two mols of ammonium hydrogen sulfide.

6. A rubber product which has been vulcanized in the presence of the reaction product of substantially equimolecular proportions of an aromatic hydroxy compound and pentamethylene diamino disulfide.

7. A rubber product which has been vulcanized in the presence of the reaction product of about one mol of a phenol, five mols of formaldehyde, and two mols of ammonium hydrogen sulfide.

8. A rubber product which has been vulcanized in the presence of the reaction product of about one mol of a naphthol, five mols of formaldehyde and two mols of ammonium hydrogen sulfide.

WILLIAM P. ter HORST.